United States Patent
Song et al.

(10) Patent No.: US 8,515,436 B2
(45) Date of Patent: Aug. 20, 2013

(54) MANAGEMENT OF WIRELESS CONNECTIONS

(75) Inventors: Osok Song, San Diego, CA (US); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 634 days.

(21) Appl. No.: 12/412,140

(22) Filed: Mar. 26, 2009

(65) Prior Publication Data

US 2009/0247176 A1    Oct. 1, 2009

Related U.S. Application Data

(60) Provisional application No. 61/039,838, filed on Mar. 27, 2008.

(51) Int. Cl.
| | |
|---|---|
| H04M 1/66 | (2006.01) |
| H04W 4/00 | (2009.01) |
| H04W 72/00 | (2009.01) |
| H04W 24/00 | (2009.01) |
| H04B 7/00 | (2006.01) |

(52) U.S. Cl.
USPC ..... 455/450; 455/410; 455/435.1; 455/456.1; 455/524

(58) Field of Classification Search
USPC   455/352–354, 404.1, 410–411, 412.1–412.2, 455/413, 414.1–414.4, 415–417, 422.1, 423, 455/432.1–432.3, 433–434, 435.1–435.3, 455/436, 458, 409, 524; 379/67, 88, 177–179, 379/182, 185, 187, 209, 266, 309
See application file for complete search history.

(56) References Cited

U.S. PATENT DOCUMENTS

| | | | | |
|---|---|---|---|---|
| 5,710,805 | A | * | 1/1998 | Armbruster et al. ........... 455/433 |
| 5,844,521 | A | * | 12/1998 | Stephens et al. ............ 342/357.2 |
| 5,907,805 | A | * | 5/1999 | Chotai ........................ 455/414.1 |
| 5,926,745 | A | * | 7/1999 | Threadgill et al. ............ 455/12.1 |
| 5,930,709 | A | * | 7/1999 | Park et al. ................... 455/435.1 |
| 5,937,352 | A | * | 8/1999 | Courtney et al. ........... 455/435.1 |
| 6,002,932 | A | * | 12/1999 | Kingdon et al. ............... 455/433 |
| 6,072,986 | A | * | 6/2000 | Blanchard et al. ........... 455/13.4 |
| 6,115,580 | A | * | 9/2000 | Chuprun et al. .................. 455/1 |

(Continued)

FOREIGN PATENT DOCUMENTS

| | | |
|---|---|---|
| CN | 1853435 A | 10/2006 |
| CN | 1939001 A | 3/2007 |

(Continued)

OTHER PUBLICATIONS

International Search Report & Written Opinion—PCT/US09/038672 International Search Authority—European Patent Office—Jul. 14, 2009.

(Continued)

*Primary Examiner* — Dwayne Bost
*Assistant Examiner* — Scott Trandai
(74) *Attorney, Agent, or Firm* — François A. Pelaez

(57) ABSTRACT

Techniques for signaling whether or not a radio resource control (RRC) connection should be maintained are provided. The signaling may be provided, for example, in existing NAS transport messages, or in separate messages. The signaling may be provided in the uplink and/or downlink direction.

30 Claims, 15 Drawing Sheets

(56) References Cited

U.S. PATENT DOCUMENTS

| | | | |
|---|---|---|---|
| 6,178,325 B1* | 1/2001 | Hazama | 455/432.1 |
| 6,181,940 B1* | 1/2001 | Rune | 455/435.2 |
| 6,272,315 B1* | 8/2001 | Chang et al. | 455/13.1 |
| 6,343,205 B1* | 1/2002 | Threadgill et al. | 455/12.1 |
| 6,708,031 B2* | 3/2004 | Purnadi et al. | 455/436 |
| 6,763,112 B1* | 7/2004 | Haumont | 380/247 |
| 6,792,277 B2* | 9/2004 | Rajaniemi et al. | 455/456.1 |
| 6,909,895 B2* | 6/2005 | Einola et al. | 455/423 |
| 6,917,805 B1* | 7/2005 | Jang | 455/433 |
| 7,020,477 B2* | 3/2006 | Cramby et al. | 455/458 |
| 7,046,992 B2* | 5/2006 | Wallentin et al. | 455/411 |
| 7,047,012 B1* | 5/2006 | Gerszberg et al. | 455/445 |
| 7,085,294 B2* | 8/2006 | Longoni et al. | 370/509 |
| 7,233,671 B2* | 6/2007 | Wu | 380/270 |
| 7,403,621 B2* | 7/2008 | Vialen et al. | 380/272 |
| 7,450,956 B1* | 11/2008 | Isomae | 455/458 |
| 7,558,579 B2* | 7/2009 | Gerszberg et al. | 455/445 |
| 7,561,879 B2* | 7/2009 | Kuchibhotla et al. | 455/435.2 |
| 7,773,987 B2* | 8/2010 | Jain et al. | 455/435.1 |
| 7,782,818 B2* | 8/2010 | Hurtta et al. | 370/331 |
| 7,844,275 B2* | 11/2010 | Gerszberg et al. | 455/445 |
| 7,852,817 B2* | 12/2010 | Gallagher et al. | 370/338 |
| 7,912,004 B2* | 3/2011 | Gallagher et al. | 370/329 |
| 7,991,387 B2* | 8/2011 | Rowley et al. | 455/411 |
| 7,995,994 B2* | 8/2011 | Khetawat et al. | 455/410 |
| 2001/0046240 A1* | 11/2001 | Longoni et al. | 370/503 |
| 2002/0066011 A1* | 5/2002 | Vialen et al. | 713/150 |
| 2002/0147021 A1* | 10/2002 | June | 455/452 |
| 2003/0003895 A1* | 1/2003 | Wallentin et al. | 455/410 |
| 2006/0234706 A1* | 10/2006 | Wallentin | 455/436 |
| 2007/0214269 A1* | 9/2007 | Davidsson | 709/227 |
| 2007/0223409 A1* | 9/2007 | Herrero | 370/310 |
| 2007/0270140 A1* | 11/2007 | Islam et al. | 455/423 |
| 2007/0297367 A1* | 12/2007 | Wang et al. | 370/331 |
| 2008/0039087 A1* | 2/2008 | Gallagher et al. | 455/435.2 |
| 2008/0076392 A1* | 3/2008 | Khetawat et al. | 455/411 |
| 2008/0076393 A1* | 3/2008 | Khetawat et al. | 455/411 |
| 2008/0076412 A1* | 3/2008 | Khetawat et al. | 455/432.1 |
| 2008/0076419 A1* | 3/2008 | Khetawat et al. | 455/435.1 |
| 2008/0076420 A1* | 3/2008 | Khetawat et al. | 455/435.1 |
| 2008/0076425 A1* | 3/2008 | Khetawat et al. | 455/436 |
| 2008/0096530 A1* | 4/2008 | Kuo | 455/411 |
| 2008/0132224 A1* | 6/2008 | Gallagher et al. | 455/422.1 |
| 2008/0200171 A1* | 8/2008 | Jeong et al. | 455/436 |
| 2008/0240439 A1* | 10/2008 | Mukherjee et al. | 380/272 |
| 2008/0261596 A1* | 10/2008 | Khetawat et al. | 455/436 |
| 2008/0261600 A1* | 10/2008 | Somasundaram et al. | 455/436 |
| 2008/0267405 A1* | 10/2008 | Vialen et al. | 380/270 |
| 2008/0305792 A1* | 12/2008 | Khetawat et al. | 455/435.1 |
| 2008/0305793 A1* | 12/2008 | Gallagher et al. | 455/435.1 |
| 2008/0310378 A1* | 12/2008 | Kitazoe et al. | 370/338 |
| 2009/0017863 A1* | 1/2009 | Rowley et al. | 455/550.1 |
| 2009/0028084 A1* | 1/2009 | Ping | 370/311 |
| 2009/0042560 A1* | 2/2009 | Islam et al. | 455/423 |
| 2009/0042576 A1* | 2/2009 | Mukherjee et al. | 455/436 |
| 2009/0061877 A1* | 3/2009 | Gallagher et al. | 455/436 |
| 2009/0111423 A1* | 4/2009 | Somasundaram et al. | 455/410 |
| 2009/0252132 A1* | 10/2009 | Song et al. | 370/338 |
| 2009/0270098 A1* | 10/2009 | Gallagher et al. | 455/435.1 |
| 2009/0270099 A1* | 10/2009 | Gallagher et al. | 455/435.1 |
| 2009/0303971 A1* | 12/2009 | Kim et al. | 370/338 |
| 2009/0316664 A1* | 12/2009 | Wu | 370/336 |
| 2010/0056156 A1* | 3/2010 | Xu et al. | 455/436 |
| 2010/0067697 A1* | 3/2010 | Casati et al. | 380/270 |
| 2010/0165905 A1 | 7/2010 | Kanazawa et al. | |
| 2010/0166184 A1* | 7/2010 | Wu | 380/270 |
| 2010/0173610 A1* | 7/2010 | Kitazoe et al. | 455/411 |
| 2010/0222023 A1* | 9/2010 | Aoyama et al. | 455/411 |
| 2010/0297979 A1* | 11/2010 | Watfa et al. | 455/404.1 |
| 2011/0096671 A1* | 4/2011 | Lindstrom et al. | 370/242 |

FOREIGN PATENT DOCUMENTS

| | | |
|---|---|---|
| EP | 1517574 A1 | 3/2005 |
| JP | H10501377 A | 2/1998 |
| JP | 2003503987 A | 1/2003 |
| JP | 2007506313 A | 3/2007 |
| JP | 2007524302 A | 8/2007 |
| WO | WO9533347 A1 | 12/1995 |
| WO | WO0103463 A1 | 1/2001 |
| WO | WO0191370 A2 | 11/2001 |
| WO | WO2005076538 | 9/2006 |
| WO | WO2008023792 A1 | 2/2008 |

OTHER PUBLICATIONS

"3rd Generation Partnership Project; Technical Specification Group Services and System Aspects; General Packet Radio Service (GPRS); Service description; Stage 2 (Release 8); 23.060; Excerpt ps. 1, 16, 50-53", 3GPP Standard; 3GPP TS 23.060, 3rd Generation Partnership Project (3GPP), Mobile Competence Centre ; 650, Route Des Lucioles ; F-06921 Sophia-Antipolis Cedex ; France, No. V8.0.0, Mar. 1, 2008, pp. 1-218.

"3rd Generation Partnership Project; Technical Specification Group Services and System Aspects; General Packet Radio Service (GPRS); Service description; Stage 2 (Release7)", 3GPP Standard; 3GPP TS 23.060, 3rd Generation Partnership Project, V7.6.0, Dec. 2007.

Taiwan Search Report—TW098110307—TIPO—Jul. 8, 2012.

* cited by examiner

MANAGEMENT OF WIRELESS CONNECTIONS

RELATED APPLICATIONS

The present application for patent claims priority to U.S. Provisional Application No. 61/039,838 entitled "Management of RRC connections Without SAE Bearers" filed Mar. 27, 2008, hereby expressly incorporated by reference in its entirety.

BACKGROUND

1. Field

Certain aspects of the present disclosure relate to wireless communications and, more particularly, to management of wireless connections.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

There are some issues connected with persistence of a radio resource control (RRC) connection established to carry non-access stratum (NAS) messaging, and maintenance of security for such a connection

SUMMARY

Certain aspects provide a method for wireless communications. The method generally includes establishing a radio resource control (RRC) connection for transmitting a non-access stratum (NAS) message, receiving an indication of whether or not to retain the RRC connection after transmission of the NAS message, and maintaining or closing the RRC connection, based on the indication.

Certain aspects provide a method for wireless communications. The method generally includes transmitting a non-access stratum (NAS) message and providing an indication of whether or not to retain an RRC connection associated with the NAS message.

Certain aspects provide an apparatus for wireless communications. The apparatus generally includes logic for establishing an RRC connection for transmitting a non-access stratum (NAS) message, logic for receiving an indication of whether or not to retain the RRC connection after transmission of the NAS message, and logic for maintaining or closing the RRC connection, based on the indication.

Certain aspects provide an apparatus for wireless communications. The apparatus generally includes logic for transmitting a non-access stratum (NAS) message and logic for providing an indication of whether or not to retain an RRC connection associated with the NAS message.

Certain aspects provide an apparatus for wireless communications. The apparatus generally includes means for establishing an RRC connection for transmitting a non-access stratum (NAS) message, means for receiving an indication of whether or not to retain the RRC connection after transmission of the NAS message, and means for maintaining or closing the RRC connection, based on the indication.

Certain aspects provide an apparatus for wireless communications. The apparatus generally includes means for transmitting a non-access stratum (NAS) message, and means for providing an indication of whether or not to retain an RRC connection associated with the NAS message.

Certain aspects provide a computer-program product for wireless communications, comprising a computer-readable medium having instructions stored thereon, the instructions being executable by one or more processors. The instructions generally include instructions for establishing an RRC connection for transmitting a non-access stratum (NAS) message, instructions for receiving an indication of whether or not to retain the RRC connection after transmission of the NAS message, and instructions for maintaining or closing the RRC connection, based on the indication.

Certain aspects provide a computer-program product for wireless communications, comprising a computer-readable medium having instructions stored thereon, the instructions being executable by one or more processors. The instructions generally include instructions for transmitting a non-access stratum (NAS) message and instructions for providing an indication of whether or not to retain an RRC connection associated with the NAS message.

Certain aspects provide an apparatus for wireless communications. The apparatus generally includes at least one processor configured to establish an RRC connection for transmitting a non-access stratum (NAS) message, receive an indication of whether or not to retain the RRC connection after transmission of the NAS message, and maintain or close the RRC connection, based on the indication; and a memory coupled to the processor.

Certain aspects provide an apparatus for wireless communications. The apparatus generally includes at least one processor configured to transmit a non-access stratum (NAS) message and provide an indication of whether or not to retain an RRC connection associated with the NAS message; and a memory coupled to the processor.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
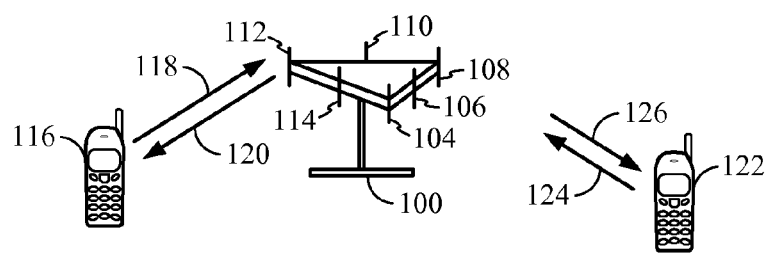
FIG. 1 illustrates an example multiple access wireless communication system according to certain aspects.

Referring to FIG. 1, a multiple access wireless communication system according to one embodiment is illustrated. An access point 100 (AP) may include multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, an evolved Node B (eNode B), or some other terminology. An access terminal may also be called an access terminal, user equipment (UE), a wireless communication device, terminal, access terminal or some other terminology.

Figure 2:
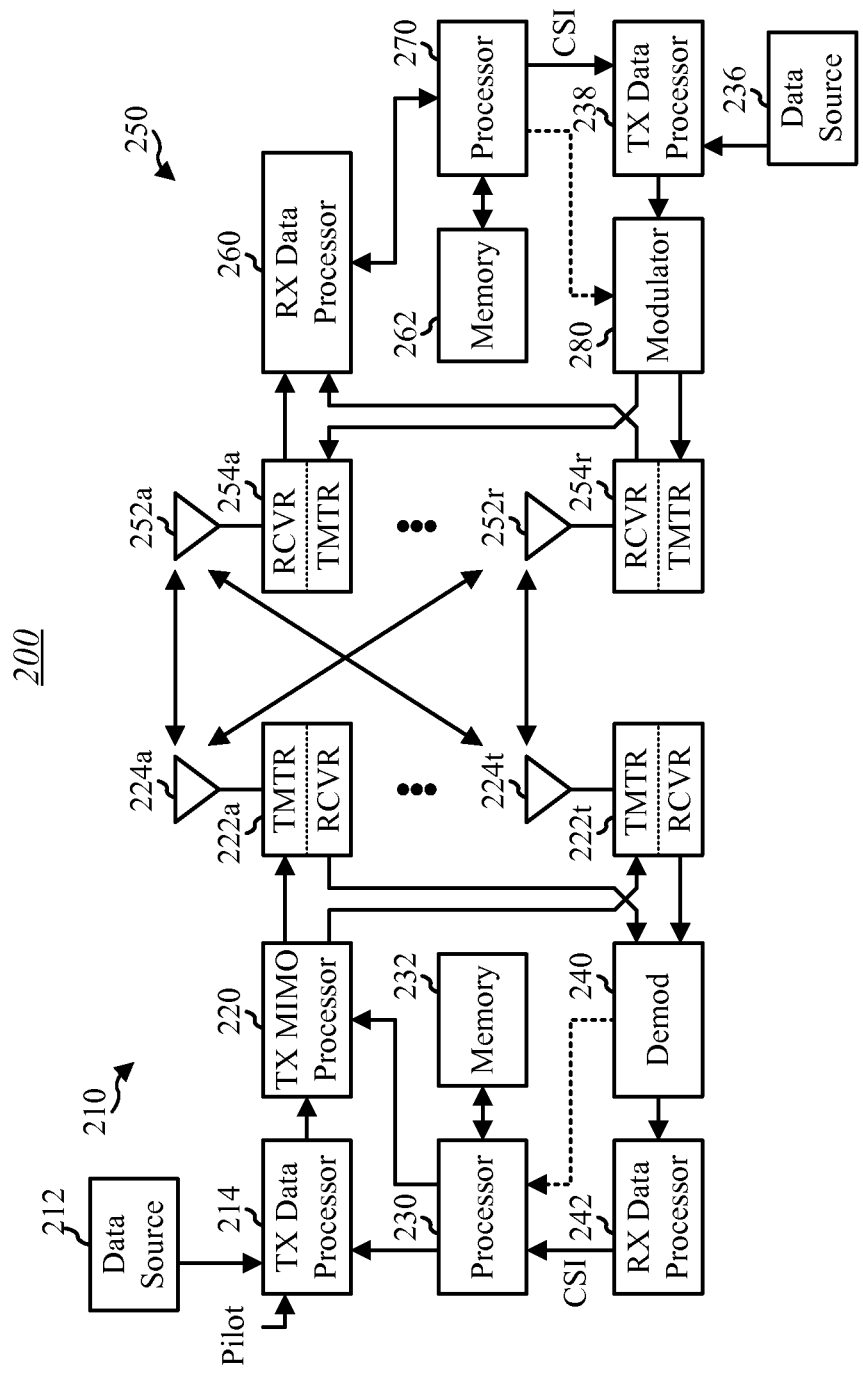
FIG. 2 illustrates a block diagram of an example wireless communication system according to certain aspects.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and a plurality of PHY channels. The PHY channels comprises a set of DL channels and UL channels The DL PHY channels may comprise, for example, a Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), and a Paging Indicator Channel (PICH), Load Indicator Channel (LICH).

The UL PHY Channels may comprise, for example, a Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Premature and Late Release of an RRC Connection

Figure 3A:
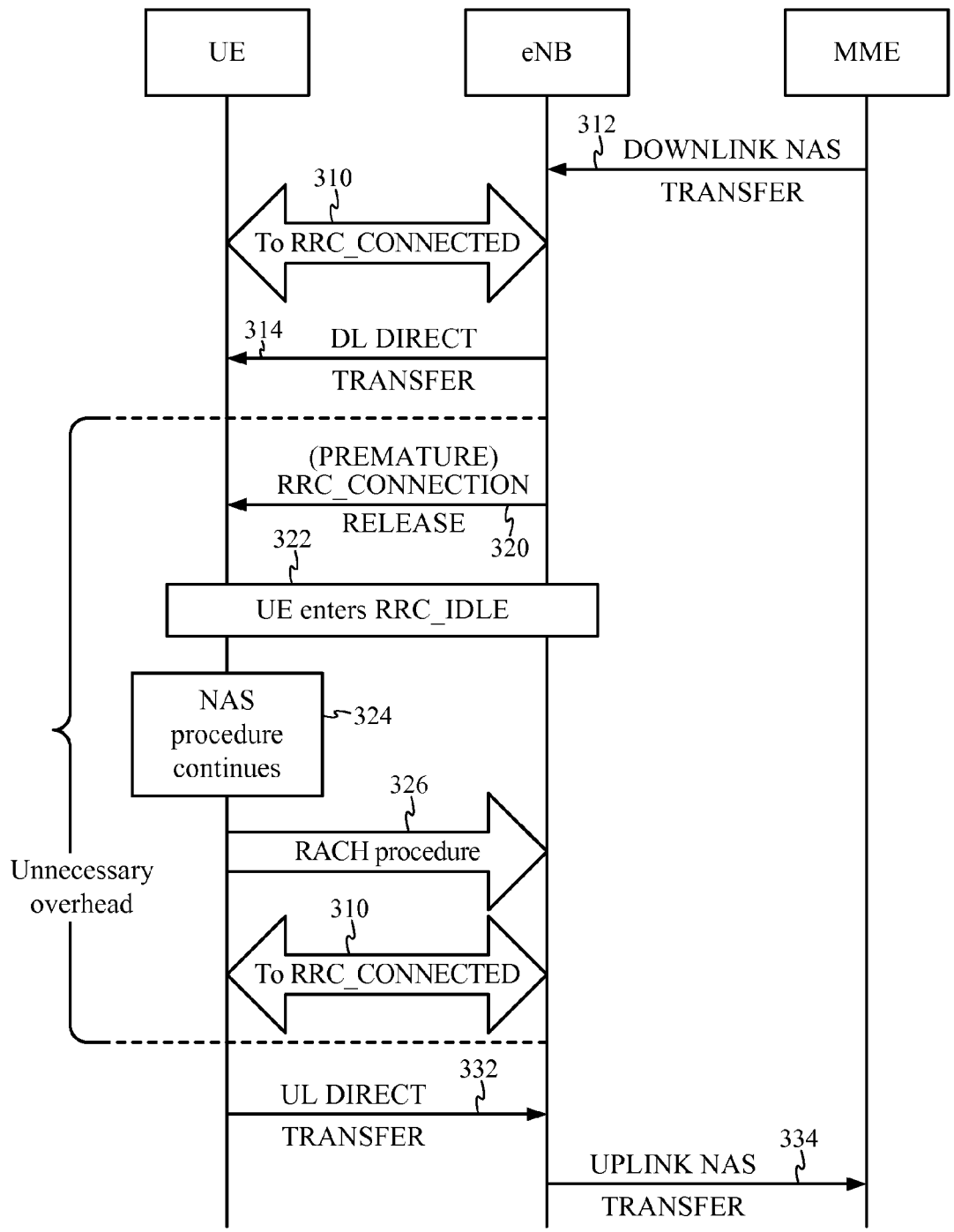
FIGS. 3A and 3B illustrate releasing an RRC connection too early and too late, respectively.
Figure 3B:
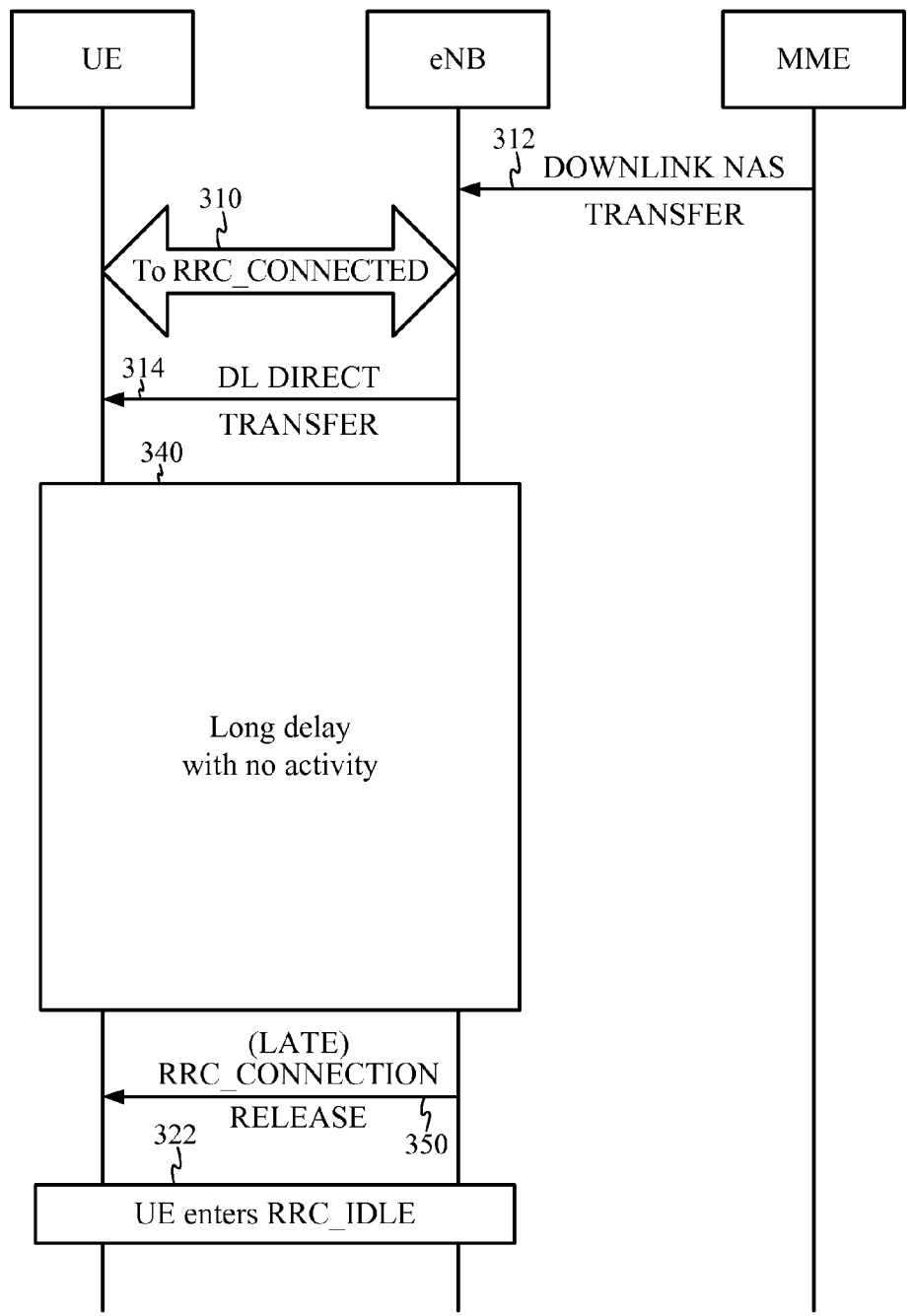

Referring to FIGS. 3A and 3B, when a mobility management entity (MME) initiates a transaction with the UE, conventional NAS signaling is opaque to eNode B, meaning the eNode B may not know how long a corresponding RRC connection is needed. As a result, there is typically no easy way to determine, at the RRC level, when the NAS interaction is completed and the connection can be released. As used herein, the term MME generally refers to an entity that manages, for example, mobility, UE identity, and security parameters, and that terminates a higher-layer protocol for which the radio-layer protocol (e.g. RRC) acts as a transport layer.

FIG. 3A illustrates the effects of a premature release of an RRC connection. In the illustrated example, the MME establishes an RRC connection 310 in order to perform a DL NAS transfer 312. With no explicit knowledge of how long the RRC connection 310 is needed, the eNode B may release the RRC connection 310 after the DL data is transferred, at 314. As a result, the UE may enter an RRC_IDLE state, at 322. However, in this example, the NAS procedure continues at 324, causing additional RACH procedure 326, in order to re-establish the RRC connection 310 in order to perform a UL transfer 332 from the UE to the eNode B and UL NAS transfer 334 from the eNode B to the MME. As illustrated, the premature release 320 results in additional overhead to re-establish the RRC connection.

FIG. 3B illustrates the effects of a late release of an RRC connection. In the illustrated example, the MME again establishes an RRC connection 310 in order to perform a DL NAS transfer 312. With no explicit knowledge of how long the RRC connection 310 is needed, the eNode B may maintain the RRC connection 310 after the DL data is transferred, at 314. As a result, even though the NAS transaction is complete in this example, the RRC connection may be maintained during a long period with no activity, at 340. The RRC connection is finally released, at 350, causing the UE to enter the RRC_IDLE state, at 322. However, maintaining the RRC connection for longer than necessary may have wasted logical resources, UE battery life and, potentially, over-the-air bandwidth.

In a related issue, there is no conventional mechanism for the MME to deliver an AS security context to the eNode B for a signaling-only connection. The only S1 messages (between the MME and eNode B) which can carry this context are the INITIAL CONTEXT SETUP REQUEST (which is used for an entire UE context, including user-plane bearers) and the UE CONTEXT MODIFICATION REQUEST (which is meaningless unless a UE context has already been established).

Figure 4:
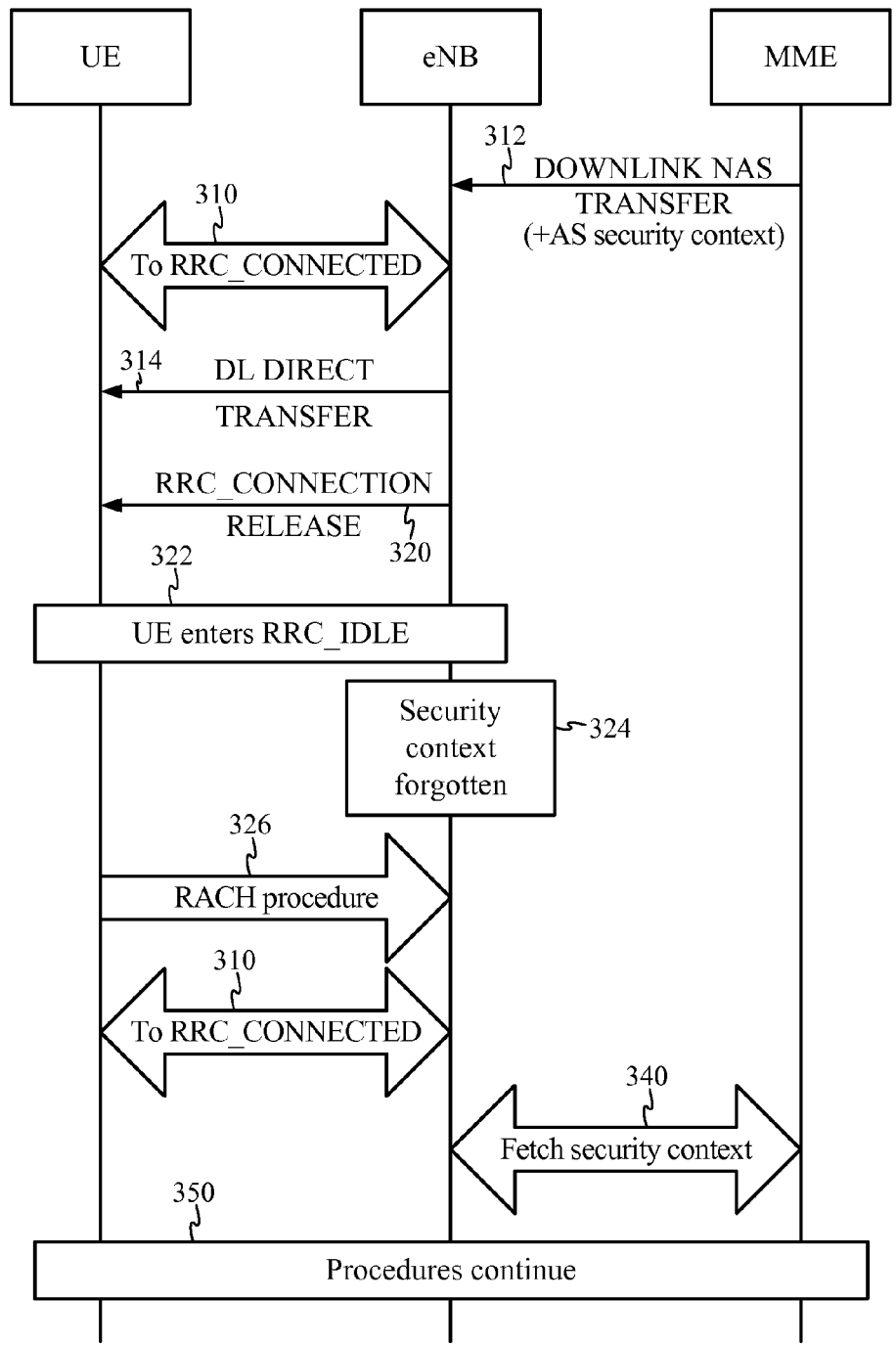
FIG. 4 illustrates repeated delivery of AS (access stratum) security context.

As illustrated in FIG. 4, one solution to the second problem may be to allow the delivery of the AS security context in a message that can cause the eNode B to establish a signaling-only connection 310, such as the DOWNLINK NAS TRANSPORT message 312. However, if the RRC connection is released early, at 320, the eNode B will also discard the AS security context, at 324. As a result, when a new NAS message is received from the UE (e.g., in response to the message that triggered the original connection establishment), there is no security available in the AS, and the UE may need to initiate RACH procedure 326 to re-establish the RRC connection 310 and delivery of the context from the MME to the eNode B must be repeated, at 340, for any RRC security to be available. Thus, the premature release again results in additional overhead.

A similar version of the premature release problem may also occur in the uplink direction. For instance, in a tracking-area update procedure, the final message of the procedure (TRACKING AREA UPDATE COMPLETE) should normally mean that there is no more need for the RRC connection. However, the eNode B may not be able to identify this message reliably and, thus, may have to choose between the risk of early releases (e.g., immediately after the TRACKING AREA UPDATE ACCEPT message is sent on the downlink) and the risk of a late release (excessive persistence, maintaining the connection needlessly after the TRACKING AREA UPDATE COMPLETE).

Explicit Indication of Release of an RRC Connection

According to certain aspects, by using an explicit indication to maintain or close the RRC connection at evolved Node B (eNB), more efficient radio resource management may be achieved. The techniques provided herein may also help avoid unnecessary repeating RRC connection setup when a UE needs to send subsequent NAS messages.

Figure 5:
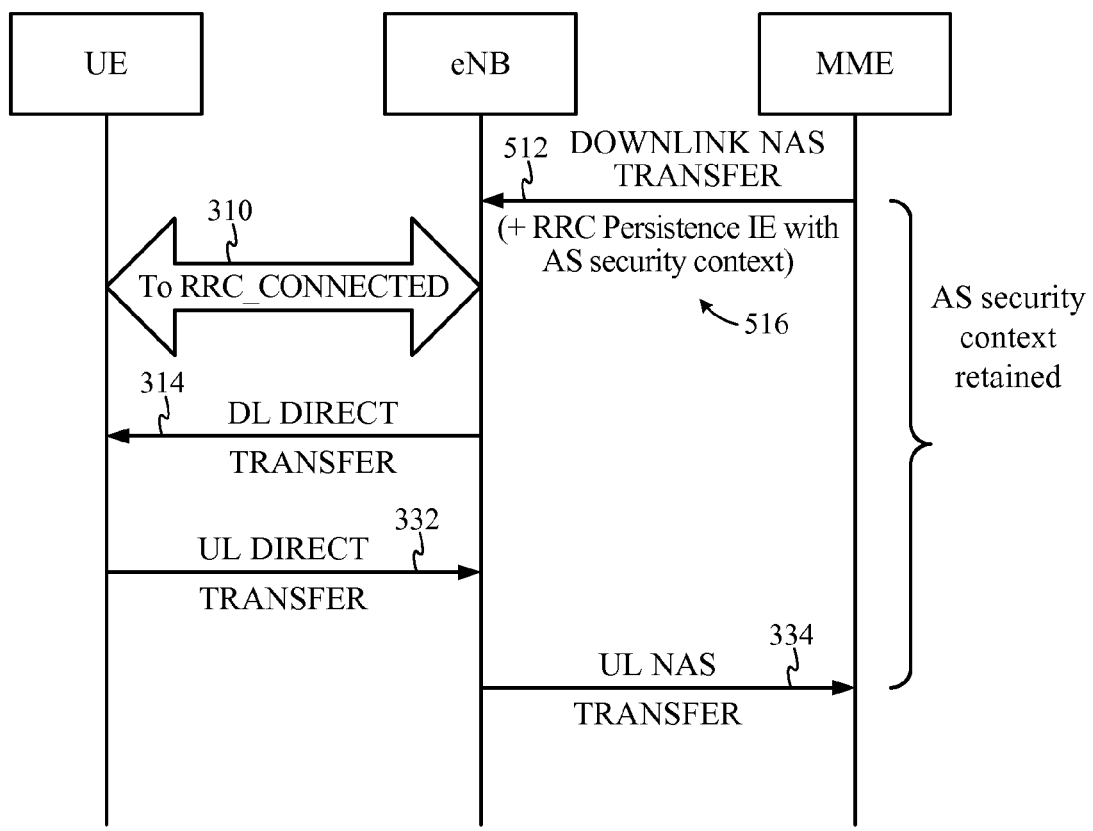
FIG. 5 illustrates releasing an RRC connection in accordance with certain aspects of the present disclosure.

FIG. 5 illustrates an example of how an MME may provide an indication of how long an RRC connection should be maintained, according to an aspect of the present disclosure. As illustrated, the MME may provide, with the transmission of a DOWNLINK NAS TRANSPORT message 512, an information element (IE) 516 to contain the UE's AS security context. If this IE is included in the message 512, the eNode B may treat the RRC connection 310 as "persistent". As used herein, the term "persistent" may mean that the eNode B maintains the RRC connection until it receives an explicit indication the RRC connection should be released (e.g., in a DL or UL message), until a predetermined time period has expired, and/or until some other event triggering release occurs.

Figure 6:
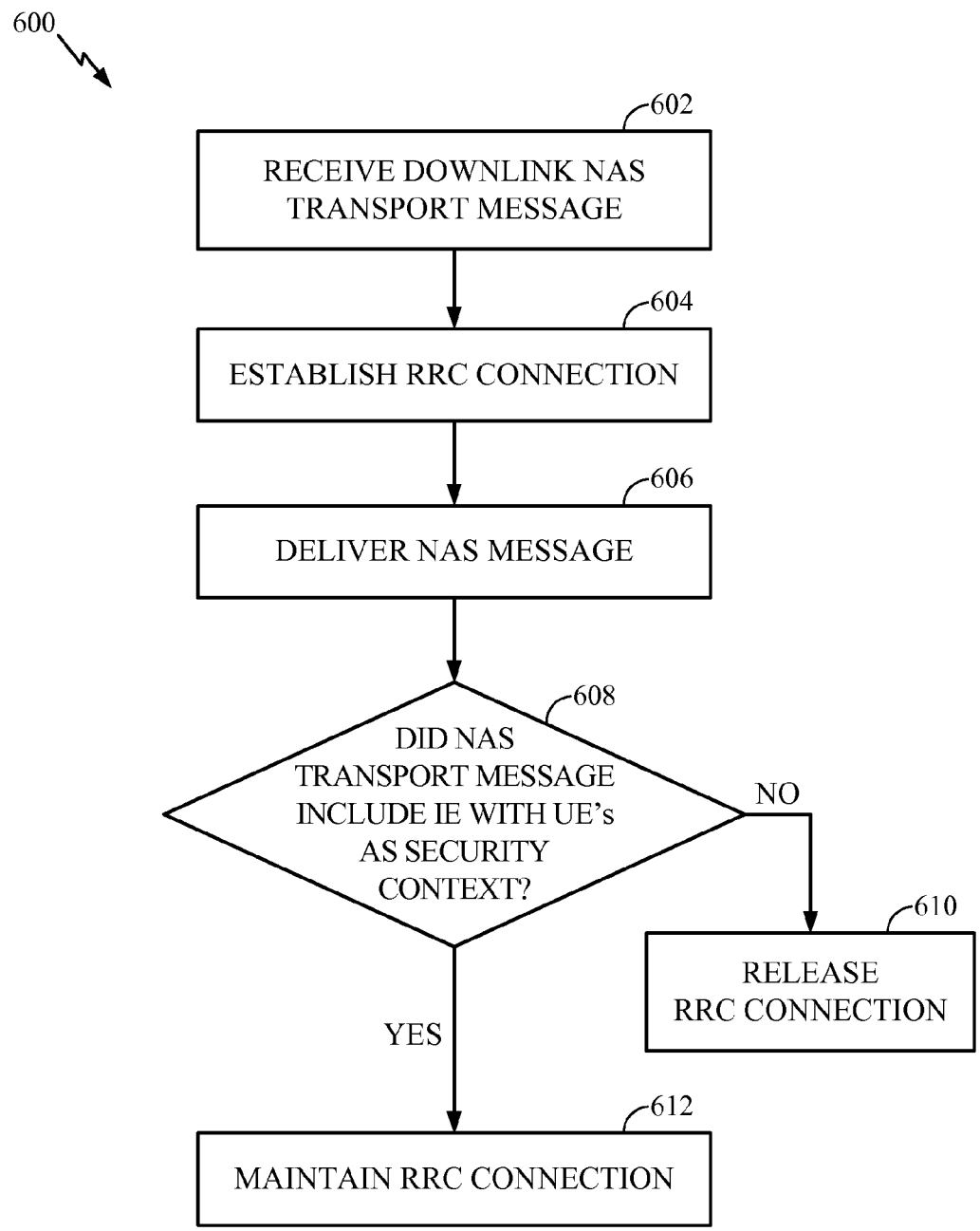
FIG. 6 illustrates example operations for releasing an RRC connection in accordance with certain aspects of the present disclosure.

FIG. 6 illustrates example operations 600 that may be performed, for example, at an eNode B to maintain or release an RRC connection based on the IE 516 shown in FIG. 5. At 602, the eNode B receives a DL NAS transport message. The eNode B establishes an RRC connection, at 604, and delivers the NAS message, at 606. If an IE with the UE's AS security context was provided with the message, as determined at 608, the RRC connection may be maintained at 612. Otherwise, the RRC connection may be released, at 610.

Signaling the eNode B to maintain the RRC connection through the IE containing the UE's AS security context may prompt the eNode B may maintain the UE's AS security context for later transactions, such as a UL data transfer 332, thereby avoiding the "security thrashing" problem illustrated in FIG. 4. Not every NAS transaction requires AS security, however, such as when the MME tries to authenticate a new UE through a AKA process. Thus, certain aspects may allow for signaling whether an RRC connection should be maintained as persistent through a signaling mechanism other than an IE that contains AS security context.

Figure 7:
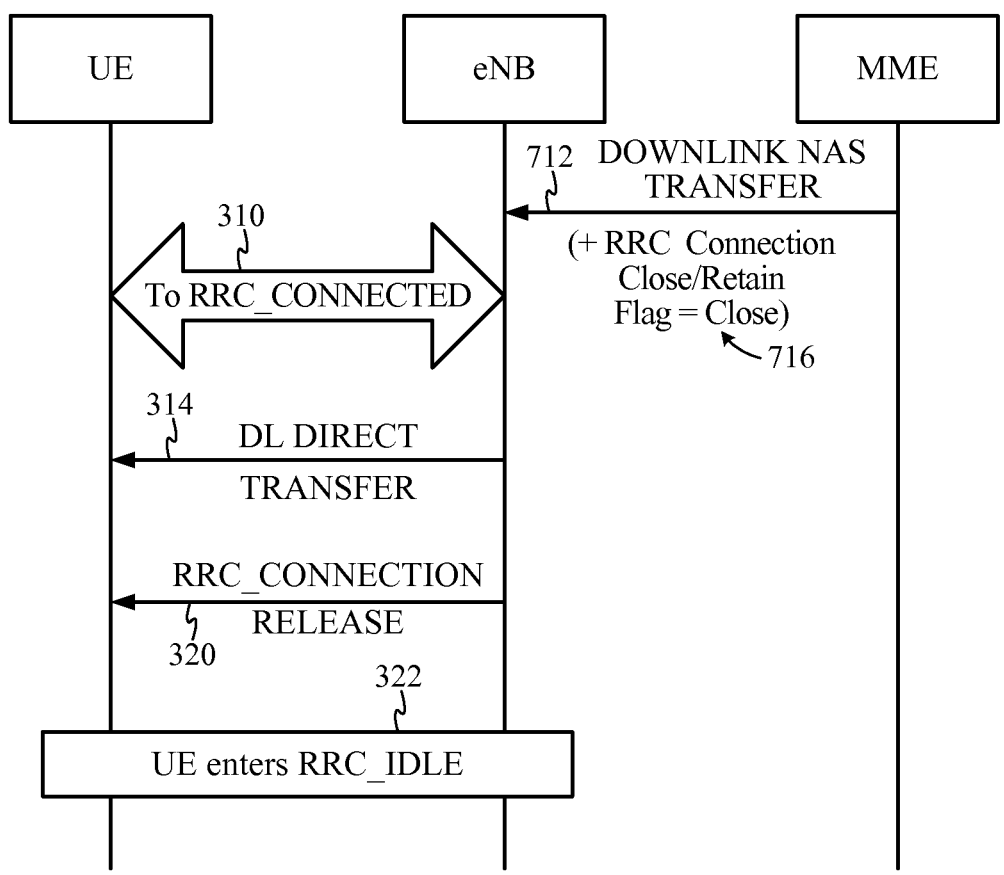
FIG. 7 illustrates releasing an RRC connection in accordance with certain aspects of the present disclosure.

For example, according to certain aspects, a message may include a flag that indicates whether an RRC connection should be closed or retained following a corresponding transaction. As illustrated in FIG. 7, a DL NAS TRANSPORT message 712 may include a flag 716 to indicate whether the RRC connection 310 should be closed or retained after deliver of the DM message, at 314. In the illustrated example, the flag 716 is set to "close" causing the eNode B to release the RRC connection, at 320, placing the UE in the RRC_IDLE state, at 322.

Figure 8:
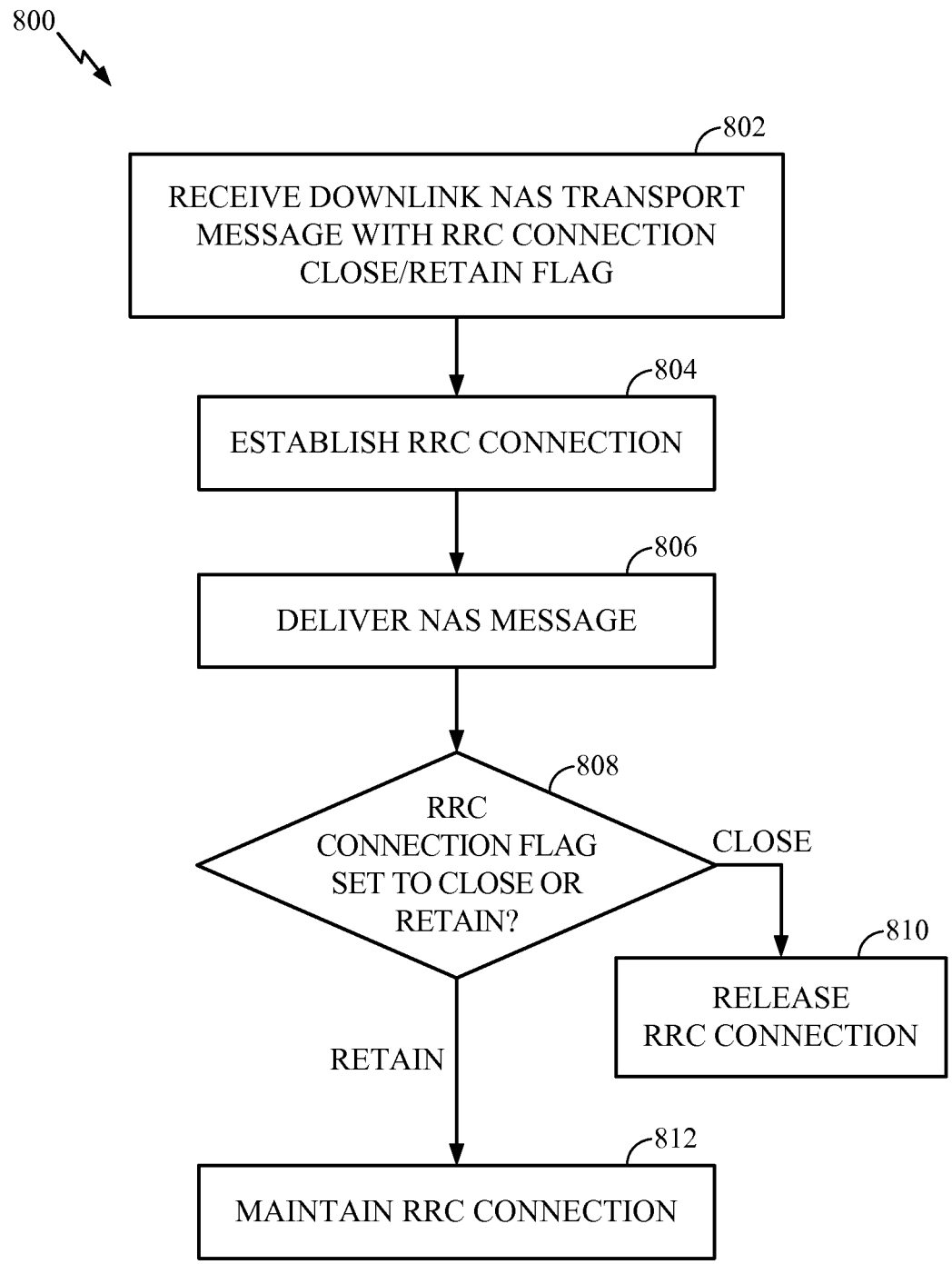
FIG. 8 illustrates example operations for releasing an RRC connection in accordance with certain aspects of the present disclosure.

FIG. 8 illustrates example operations 800 that may be performed, for example, at an eNode B to maintain or release an RRC connection based on the flag 716 shown in FIG. 7. At 802, the eNode B receives a DL NAS transport message containing an RRC connection "close/retain" flag. The eNode B establishes an RRC connection, at 804, and delivers the NAS message, at 806. If the RRC connection flag is set to "maintain", as determined at 808, the RRC treats the RRC connection as persistent and maintains the RRC connection, at 812. Otherwise, if the RRC connection flag is set to "close", the eNode B is given "permission" to release the RRC connection, at 810.

While the examples illustrated above have involved signaling in downlink messages, similar signaling may be accomplished in the uplink, for example, allowing the UE to include an indicator in (some or all) uplink RRC messages that carry a NAS message. For example, RRC messages that can carry a NAS message in the uplink direction (e.g., UL DIRECT TRANSFER and RRC CONNECTION ESTABLISHMENT COMPLETE messages) may also include a "NAS transaction complete" flag.

Figure 9:
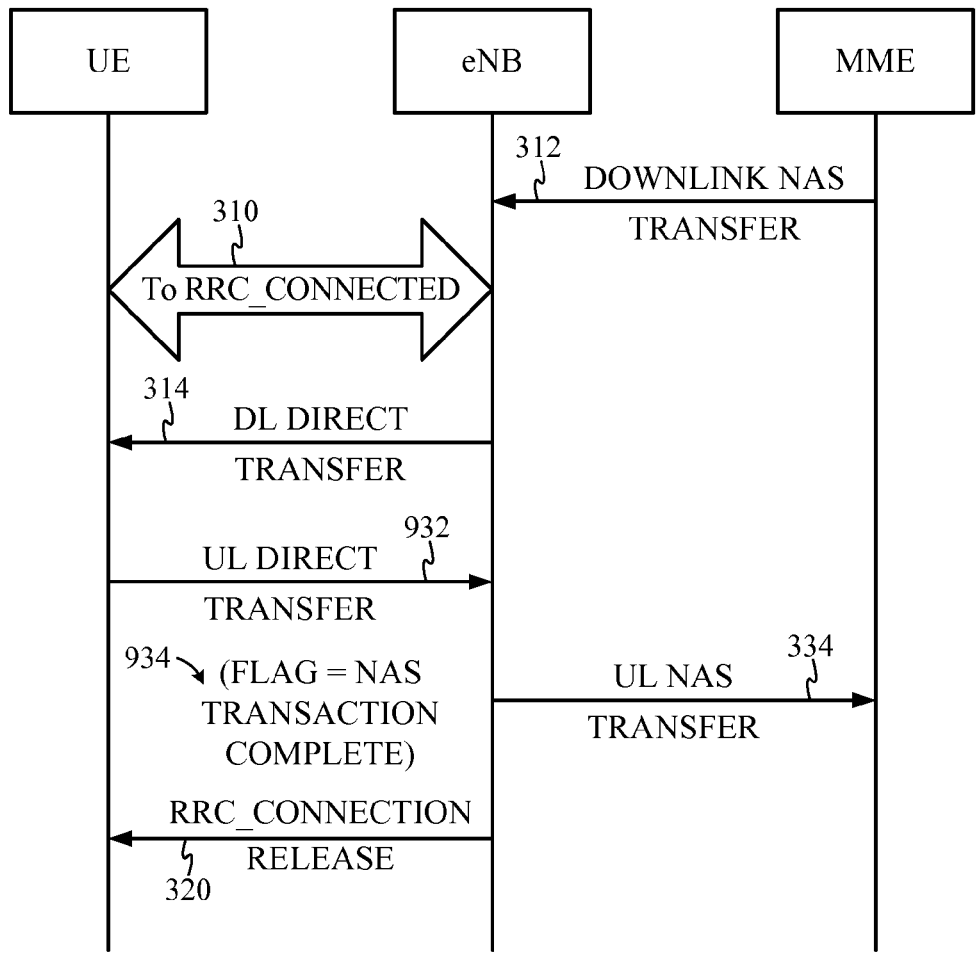
FIG. 9 illustrates releasing an RRC connection in accordance with certain aspects of the present disclosure.

This approach is illustrated in FIG. 9, in which a UL NAS transport message 932 includes a flag 934. As illustrated, if this flag indicates completion of the transaction, the eNode B may be alerted that there is no expected further need for the RRC connection related to NAS signaling and the RRC connection may be released, at 320, after delivering the UL NAS transfer message 334 to the MME.

Figure 10:
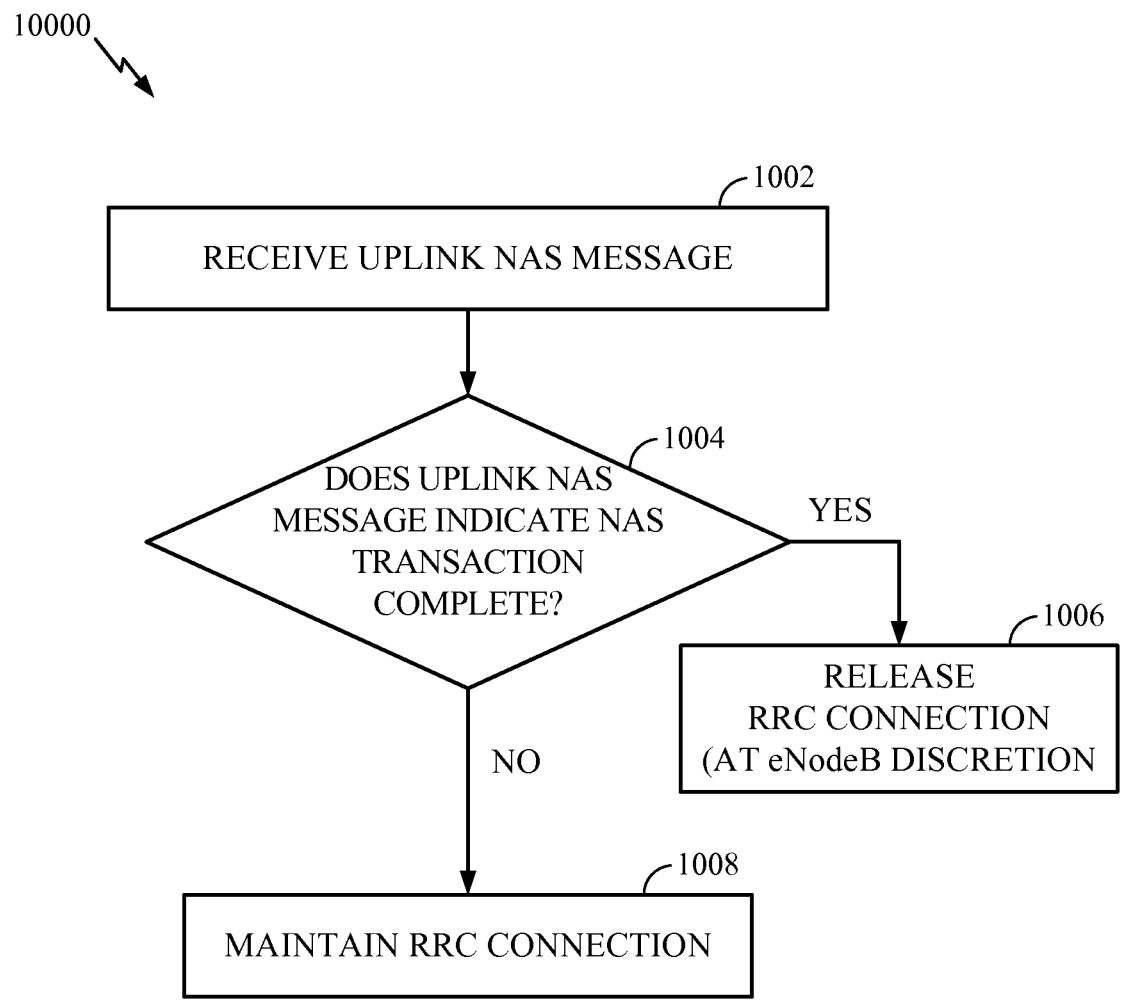
FIG. 10 illustrates example operations for releasing an RRC connection in accordance with certain aspects of the present disclosure.

FIG. 10 illustrates example operations 1000 that may be performed, for example, at an eNode B to maintain or release an RRC connection based on the flag 934 shown in FIG. 9. The example operations 1000 assume that an RRC connection has already been established.

At 1002, the eNode B receives a DL NAS transport message containing a NAS transaction complete flag. If the NAS transaction complete flag indicates the NAS transaction is not complete, as determined at 1004, the RRC maintains the RRC connection, at 1008. Otherwise, if the NAS transaction complete flag indicates the NAS transaction is complete, the eNode B may release the RRC connection, at 1006.

As indicated in FIG. 10, even if the UE or MME indicated that an RRC connection is no longer needed, the eNode B may be given final discretion on whether or not to release the connection. In other words, since the RRC CONNECTION RELEASE message is actually generated by the eNode B, the eNode B may consider the UL or DL signals (whether by IEs, flags, or separate messages, as will be described below), as indications it is "permissible" to release or maintain a connection and may ultimately consider other factors.

As noted above, how an eNode B maintains an RRC connection as "persistent" may vary according to different aspects and may be left to the eNode B. According to an aspect, the signaling described herein may indicate that the eNode B should retain the RRC connection for some time period, while the exact interval may be determined, for example, by a standard specification or service provider. For example, if an RRC connection is treated as "persistent", a timer may be started at connection establishment and given a duration, which could be either coded in a specification or defined by the eNode B implementation. When the timer expires, the connection may be released immediately or, as an alternative, at any time the eNode B desires.

According to certain aspects, it may be specified that the eNode B should maintain an RRC connection and wait for an explicit trigger (e.g., a flag in a message or the expiry of a timer, as noted above). In other words, if an RRC connection is treated as "persistent", the eNode B may be configured to maintain the RRC connection until an explicit indication to do so is received. As described above, this indication could be in the form of an S1-AP message from the MME with the "RRC connection close/retain" flag set to indicate "close", a specific message or indication created for the purpose on the S1 interface, a "NAS transaction complete" indication from the UE, the MME, or both.

Figure 11:
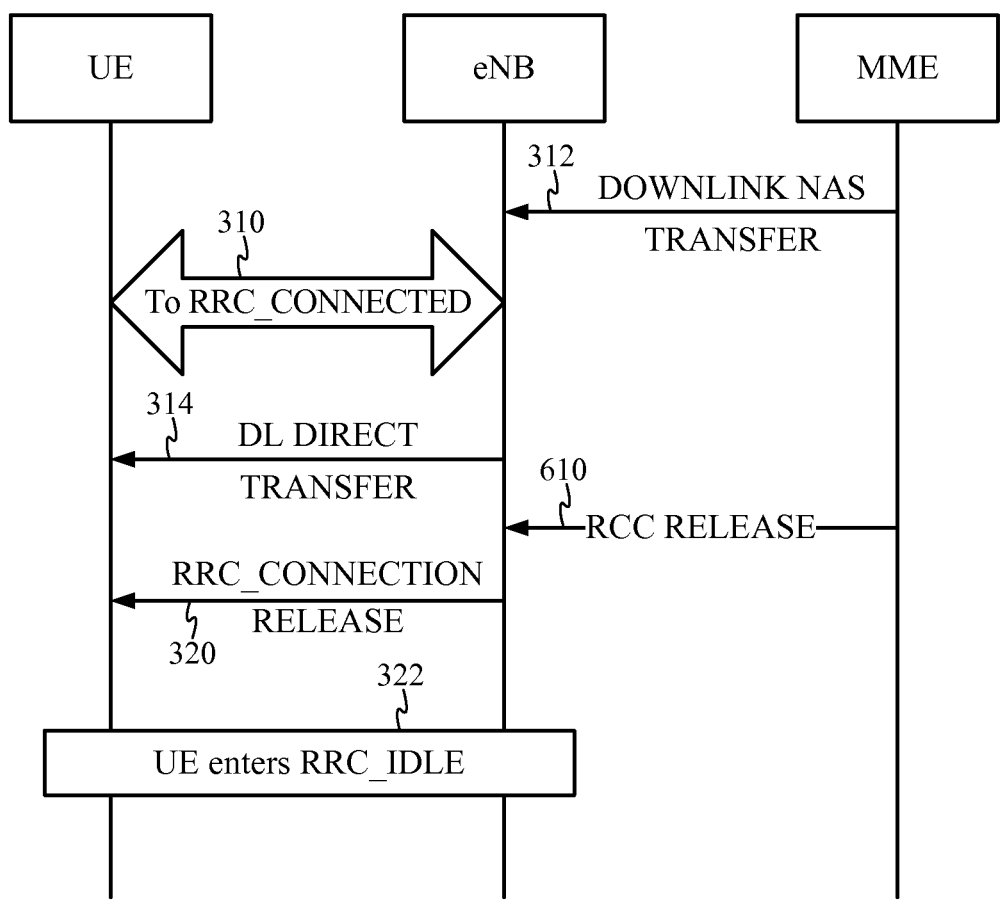
FIG. 11 illustrates releasing an RRC connection in accordance with certain aspects of the present disclosure.

The use of a separate message to signal the eNode B to release an RRC connection is illustrated in FIG. 11. As illustrated, an RRC connection 310 may be established in order to deliver a DL NAS TRANSPORT Message 312. After delivery of the message the UE, at 314, the MME may send a separate RRC RELEASE message 610, prompting the eNode B to release the connection at 320. A similar RRC RELEASE message may also be sent on the uplink, allowing the UE to signal the eNode B to release the RRC connection.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Figure 6A:
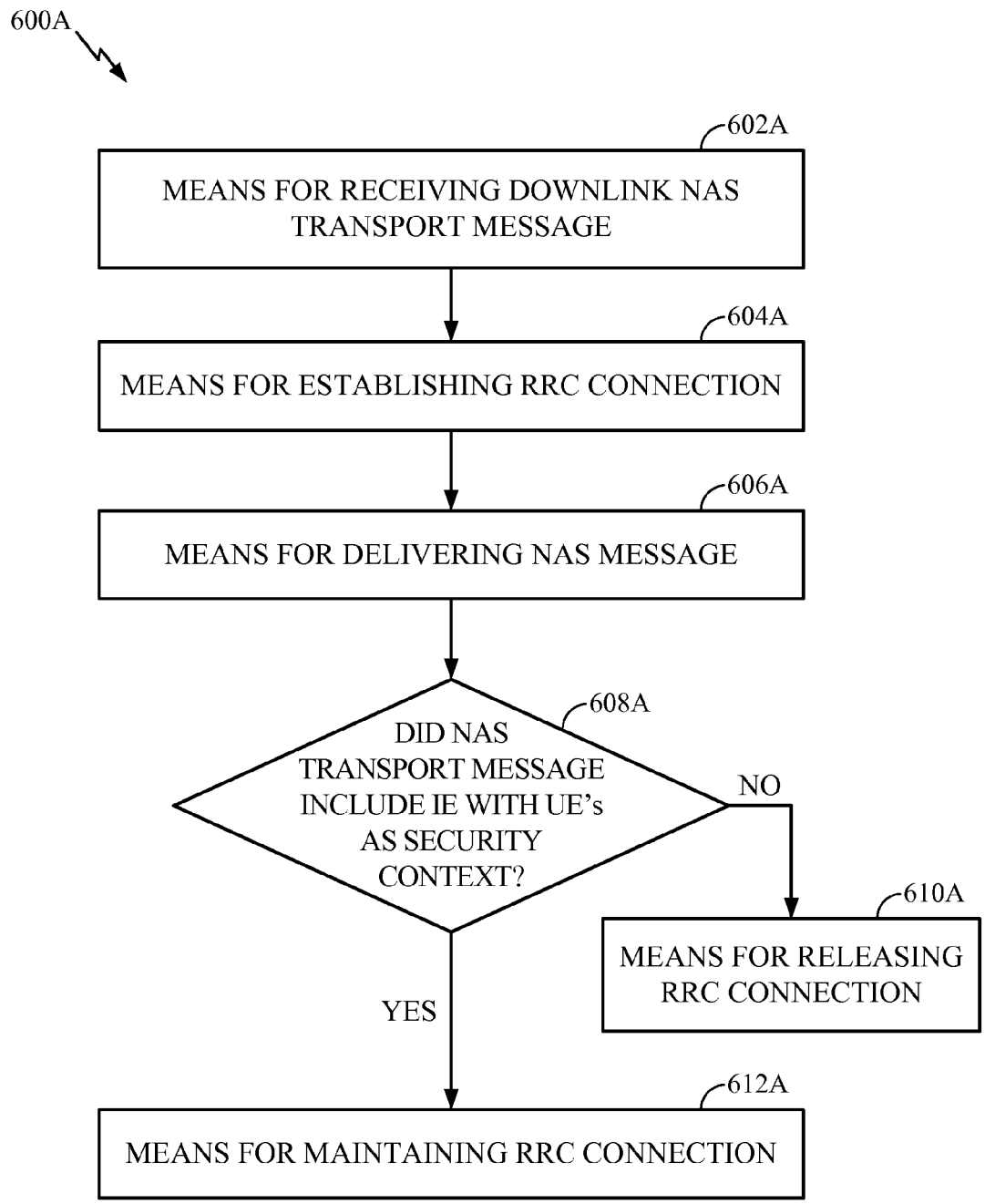
Figure 8A:
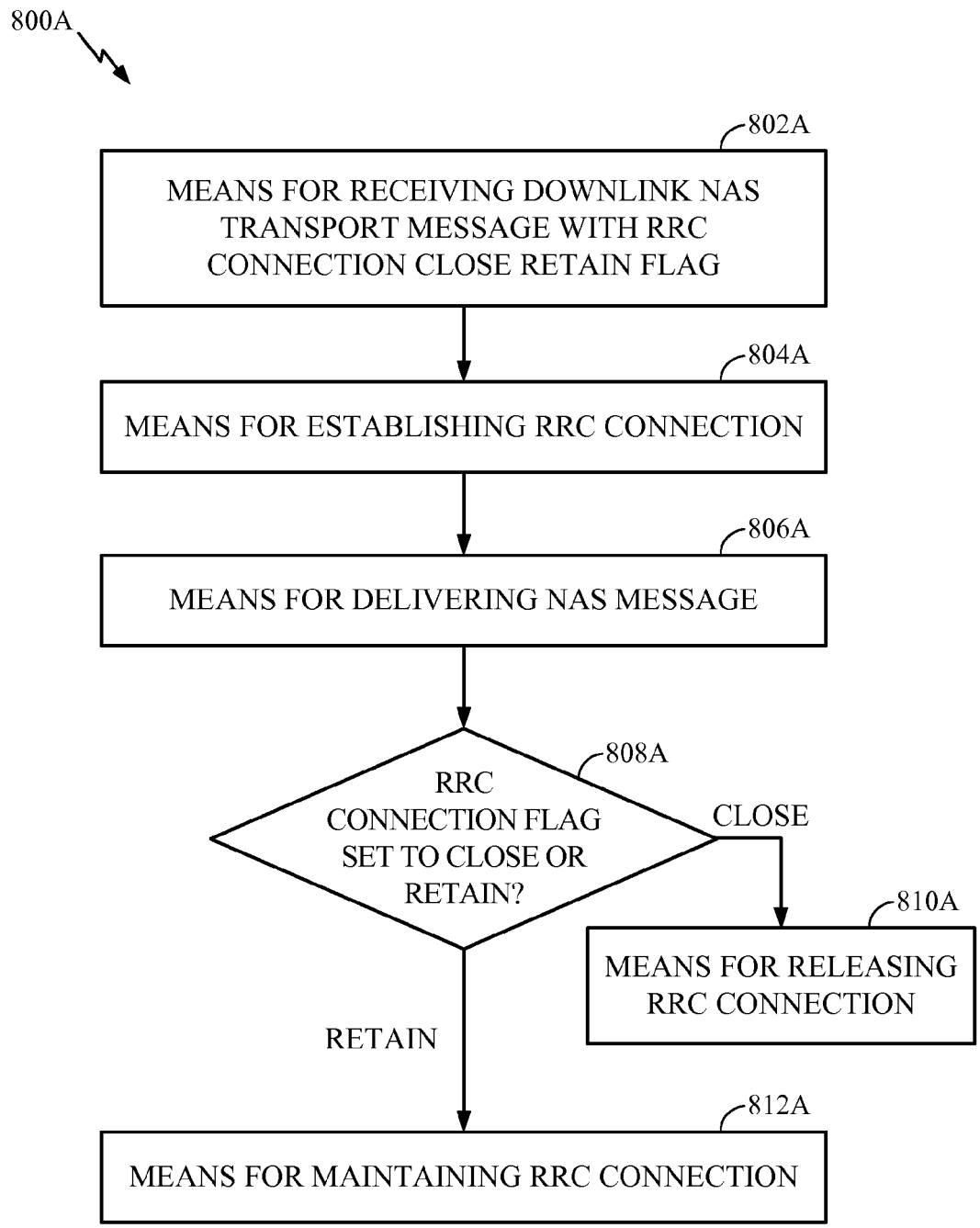
Figure 10A:
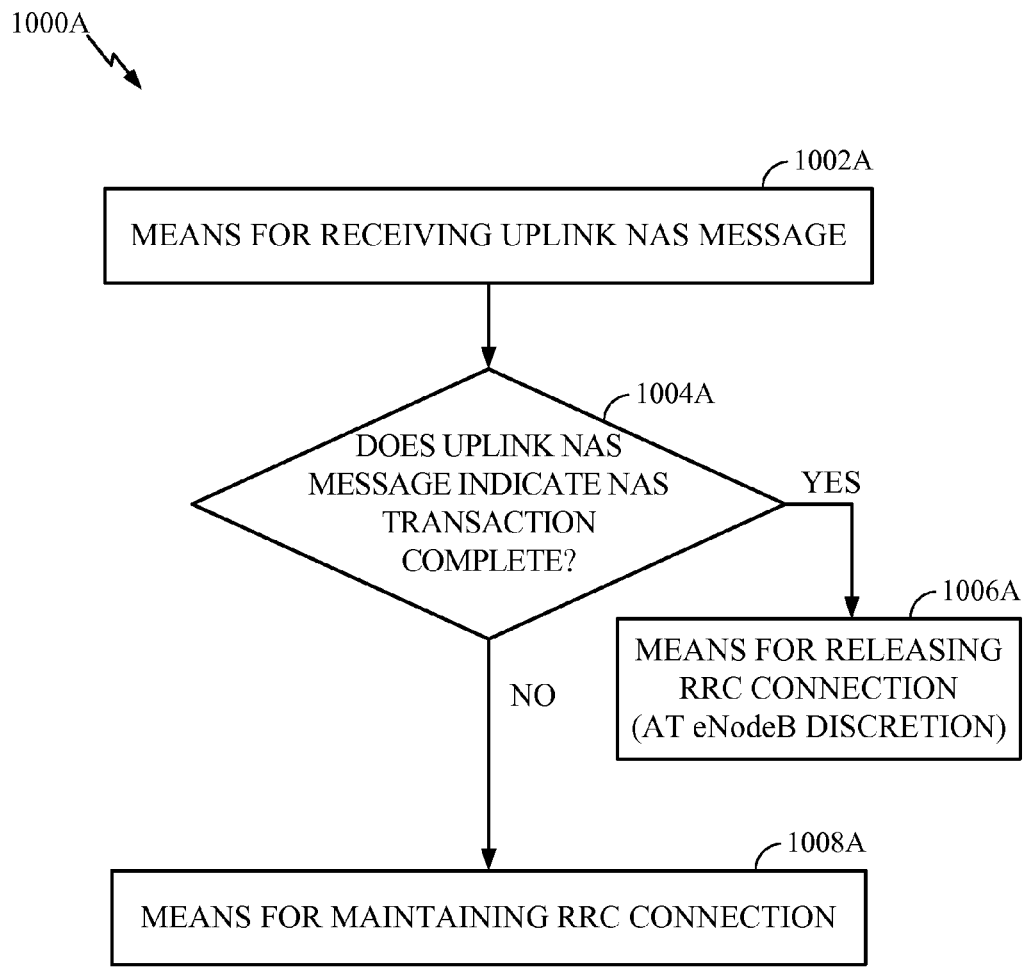

Generally, where there are methods illustrated in figures having corresponding counterpart means-plus-function figures, the operation blocks correspond to means-plus-function blocks with similar numbering. For example, operations 600 illustrated in FIG. 6 correspond to means-plus-function blocks 600A illustrated in FIG. 6A, operations 800 illustrated in FIG. 8 correspond to means-plus-function blocks 800A illustrated in FIG. 8A, and operations 1000 illustrated in FIG. 10 correspond to means-plus-function blocks 1000A illustrated in FIG. 10A.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:
   receiving at an eNode B from a mobility management entity (MME) a non-access stratum (NAS) message and an indication of whether or not for the eNode B to retain a radio resource control (RRC) connection associated with the NAS message, wherein the indication comprises an information element (IE) indicating an access stratum (AS) security context for a user equipment (UE);
   establishing the RRC connection with the UE for transmitting the NAS message to the UE:
   transmitting the NAS message to the UE; and
   maintaining or closing the RRC connection, based on the indication
   wherein receiving the indication of whether or not to retain an RRC connection associated with the NAS message comprises receiving the indication in a message transmitted separate from the NAS message.

2. The method of claim 1, wherein the indication comprises a flag indicating whether the RRC connection should be retained or closed.

3. The method of claim 1, wherein the indication is received on an uplink connection between the user equipment and the eNode B.

4. The method of claim 1, wherein the indication is received on a downlink connection between a mobility management entity (MME) and the eNode B.

5. The method of claim 1, wherein maintaining or closing the RRC connection, based on the indication comprises:
   maintaining the RRC connection, based on the indication, until the occurrence of a triggering event.

6. The method of claim 5, wherein the triggering event comprises an expiration of a timer.

7. The method of claim 5, wherein the triggering event comprises a receipt of an explicit indication to close the RRC connection.

8. The method of claim 1, wherein the eNode B receives the indication from the MME prior to the eNode B establishing the RRC connection with the UE.

9. A method for wireless communications, comprising:
   transmitting a non-access stratum (NAS) message to an eNode B; and
   providing to the eNode B from a mobility management entity (MME) an indication of whether or not for the eNode B to retain a radio resource control (RRC) connection associated with the NAS message, wherein the indication comprises an information element (IE) indicating an access stratum (AS) security context for a user equipment (UE);
   wherein providing an indication of whether or not to retain an RRC connection associated with the NAS message comprises transmitting the indication with a message transmitted separate from the NAS message.

10. The method of claim 9, wherein the indication comprises a flag indicating whether the RRC connection should be retained or closed.

11. The method of claim 9, wherein providing an indication comprises providing an indication on an uplink connection between the user equipment and the eNode B.

12. The method of claim 9, wherein providing an indication comprises providing an indication on a downlink connection between a mobility management entity (MME) and the eNode B.

13. The method of claim 9, wherein the RRC connection is maintained until the occurrence of a triggering event comprising an explicit indication to close the RRC connection.

14. The method of claim 9, wherein the eNode B receives the indication from the MME prior to the eNode B establishing the RRC connection with the UE.

15. A computer-program product for wireless communications, comprising a non-transitory computer-readable medium having logic stored thereon, the logic being executable by one or more processors and the logic comprising:
   logic for receiving at an eNode B from a mobility management entity (MME) a non-access stratum (NAS) message and an indication of whether or not for the eNode B to retain a radio resource control (RRC) connection associated with the NAS message, wherein the indication comprises an information element (IE) indicating an access stratum (AS) security context for a user equipment (UE);
   logic for establishing the RRC connection with the UE for transmitting the NAS message to the UE;
   logic for transmitting the NAS message to the UE; and
   logic for maintaining or closing the RRC connection, based on the indication;
   wherein the logic for receiving the indication of whether or not to retain an RRC connection associated with the NAS message is configured to receive the indication with a message transmitted separate from the NAS message.

16. The apparatus of claim 15, wherein the indication comprises a flag indicating whether the RRC connection should be retained or closed.

17. The apparatus of claim 15, wherein the indication is received on an uplink connection between the user equipment and the eNode B.

18. The apparatus of claim 15, wherein the indication is received on a downlink connection between a mobility management entity (MME) and the eNode B.

19. The apparatus of claim 15, wherein maintaining or closing the RRC connection, based on the indication comprises:
   maintaining the RRC connection, based on the indication, until the occurrence of a triggering event.

20. The apparatus of claim 19, wherein the triggering event comprises at least one of: expiration of a timer and receipt of an explicit indication to close the RRC connection.

21. A computer-program product for wireless communications, comprising a non-transitory computer-readable medium having logic stored thereon, the logic being executable by one or more processors and the logic comprising:
   logic for transmitting a non-access stratum (NAS) message to an eNode B; and
   logic for providing to the eNode B from a mobility management entity (MME) an indication of whether or not for the eNode B to retain a radio resource control (RRC) connection associated with the NAS message, wherein the indication comprises an information element (IE) indicating an access stratum (AS) security context for a user equipment.
   wherein the logic for providing an indication of whether or not to retain an RRC connection associated with the NAS message is configured to transmit the indication with a message transmitted separate from the NAS message.

22. The apparatus of claim 21, wherein the indication comprises a flag indicating whether the RRC connection should be retained or closed.

23. The apparatus of claim 21, wherein the logic for providing an indication is configured to provide an indication on an uplink connection between the user equipment and the eNode B.

24. The apparatus of claim 21, wherein logic for providing an indication is configured to provide an indication on a downlink connection between a mobility management entity (MME) and the eNode B.

25. An apparatus for wireless communications, comprising:
- means for receiving at an eNode B from a mobility management entity (MME) a non-access stratum (NAS) message and an indication of whether or not for the eNode B to retain a radio resource control (RRC) connection associated with the NAS message, wherein the indication comprises an information element (IE) indicating an access stratum (AS) security context for a user equipment (UE);
- means for establishing the RRC connection with the UE for transmitting the NAS message to the UE;
- means for transmitting the NAS message to the UE; and
- means for maintaining or closing the RRC connection, based on the indication.

26. An apparatus for wireless communications, comprising:
- means for transmitting a non-access stratum (NAS) message to an eNode B; and
- means for providing to the eNode B from a mobility management entity (MME) an indication of whether or not for the eNode B to retain a radio resource control (RRC) connection associated with the NAS message, wherein the indication comprises an information element (IE) indicating an access stratum (AS) security context for a user equipment (UE).

27. A computer-program product for wireless communications, comprising a non-transitory computer-readable medium having instructions stored thereon, the instructions being executable by one or more processors and the instructions comprising:
- instructions for receiving at an eNode B from a mobility management entity (MME) a non-access stratum (NAS) message and an indication of whether or not for the eNode B to retain a radio resource control (RRC) connection associated with the NAS message, wherein the indication comprises an information element (IE) indicating an access stratum (AS) security context for a user equipment (UE);
- instructions for establishing the RRC connection with the UE for transmitting the NAS message to the UE; and
- instructions for maintaining or closing the RRC connection, based on the indication.

28. A computer-program product for wireless communications, comprising a non-transitory computer-readable medium having instructions stored thereon, the instructions being executable by one or more processors and the instructions comprising:
- instructions for transmitting a non-access stratum (NAS) message to an eNode B; and
- instructions for providing to the eNode B from a mobility management entity (MME) an indication of whether or not for the eNode B to retain a radio resource control (RRC) connection associated with the NAS message, wherein the indication comprises an information element (IE) indicating an access stratum (AS) security context for a user equipment (UE).

29. An apparatus for wireless communications, comprising:
- at least one processor configured to:
  - receive at an eNode B from a mobility management entity (MME) a non-access stratum (NAS) message and an indication of whether or not for the eNode B to retain a radio resource control (RRC) connection associated with the NAS message, wherein the indication comprises an information element (IE) indicating an access stratum (AS) security context for a user equipment (UE); and
  - establish the RRC connection with the UE for transmitting the NAS message to the UE;
  - transmit the NAS message to the UE;
  - maintain or close the RRC connection, based on the indication; and
- a memory coupled to the processor.

30. An apparatus for wireless communications, comprising:
- at least one processor configured to:
  - transmit a non-access stratum (NAS) message to an eNode B, and
  - provide to the eNode B from a mobility management entity (MME) an indication of whether or not for the eNode B to retain a radio resource control (RRC) connection associated with the NAS message, wherein the indication comprises an information element (IE) indicating an access stratum (AS) security context for a user equipment (UE); and
- a memory coupled to the processor.

* * * * *